United States Patent
Miyata et al.

(10) Patent No.: US 9,321,895 B2
(45) Date of Patent: Apr. 26, 2016

(54) HIGH-ASPECT-RATIO MAGNESIUM HYDROXIDE

(75) Inventors: Shigeo Miyata, Kitakyushu (JP); Hitoshi Manabe, Sakaide (JP); Daisuke Kudo, Sakaide (JP)

(73) Assignees: KYOWA CHEMICAL INDUSTRY CO., LTD., Kagawa (JP); SEA WATER CHEMICAL INSTITUTE, INC., Fukuoka (JP)

( * ) Notice: Subject to any disclaimer, the term of this patent is extended or adjusted under 35 U.S.C. 154(b) by 341 days.

(21) Appl. No.: 13/878,786

(22) PCT Filed: Oct. 11, 2011

(86) PCT No.: PCT/JP2011/073766
§ 371 (c)(1),
(2), (4) Date: Apr. 11, 2013

(87) PCT Pub. No.: WO2012/050222
PCT Pub. Date: Apr. 19, 2012

(65) Prior Publication Data
US 2013/0210988 A1  Aug. 15, 2013

(30) Foreign Application Priority Data
Oct. 12, 2010 (JP) ................................. 2010-229707

(51) Int. Cl.
*C08K 3/22* (2006.01)
*C01F 5/22* (2006.01)
*C01F 5/14* (2006.01)
*C08L 23/12* (2006.01)

(52) U.S. Cl.
CPC ... *C08K 3/22* (2013.01); *C01F 5/14* (2013.01); *C01F 5/22* (2013.01); *C08L 23/12* (2013.01); *C01P 2004/10* (2013.01); *C01P 2004/54* (2013.01); *C01P 2004/61* (2013.01); *C01P 2004/62* (2013.01); *C01P 2006/80* (2013.01); *Y10T 428/2982* (2015.01)

(58) Field of Classification Search
CPC .... C08K 3/22; C08K 2003/2224; C01F 5/14; C01F 5/22
USPC ............................. 524/436; 423/636; 428/402
See application file for complete search history.

(56) References Cited

U.S. PATENT DOCUMENTS 3,508,869 A   4/1970  Shoaff
5,759,509 A * 6/1998  Miyata ...................... C01F 5/14
                                                        423/594.2
6,676,920 B1   1/2004  Oishi et al.
2003/0235693 A1* 12/2003  Oishi et al. ................. 428/422.8

FOREIGN PATENT DOCUMENTS

| CN | 101759923 | 6/2010 |
|---|---|---|
| EP | 0 960 907 | 12/1999 |
| JP | 33-10784 | 12/1958 |
| JP | 52-115799 | 9/1977 |
| JP | 3-1350 | 1/1991 |
| JP | 9-227784 | 9/1997 |
| JP | 2966755 | 8/1999 |
| JP | 2006-199934 | 8/2006 |
| KR | 20030028683 | 4/2003 |
| WO | 00/35808 | 6/2000 |
| WO | 2006/068303 | 6/2006 |

OTHER PUBLICATIONS

International Preliminary Report on Patentability issued May 8, 2013 and English Translation of Written Opinion of the International Searching Authority issued Jan. 31, 2012 in International Application No. PCT/JP2011/073766.
International Search Report issued Jan. 31, 2012 in International (PCT) Application No. PCT/JP2011/073766.
English translation of Office Action issued Nov. 13, 2014 in corresponding Russian Application No. 2013120972.
Extended European Search Report issued Jun. 17, 2015 in corresponding European Application No. 11832647.9.

* cited by examiner

*Primary Examiner* — Ling Choi
*Assistant Examiner* — Ronald Grinsted
(74) *Attorney, Agent, or Firm* — Wenderoth, Lind & Ponack, L.L.P.

(57) ABSTRACT

Magnesium hydroxide having a high aspect ratio, a production method thereof and a resin composition comprising the same.

The method of producing the magnesium hydroxide having a long diameter (width) of not less than 0.5 μm and aspect ratio of not less than 10, comprising the steps of:

(A) adding an alkali to and coprecipitating it with a mixed aqueous solution of a water-soluble magnesium salt and a monovalent organic acid or a salt thereof, or (B) adding an alkali aqueous solution to and coprecipitating it with an aqueous solution of a water-soluble magnesium salt and adding a monovalent organic acid or a salt thereof to the resulting product; and (C) hydrothermally treating the obtained slurry at 100° C. or higher.

6 Claims, No Drawings

HIGH-ASPECT-RATIO MAGNESIUM HYDROXIDE

TECHNICAL FIELD

The present invention relates to magnesium hydroxide having a high aspect ratio (ratio of the width to the thickness of a crystal), a production method thereof and a resin composition comprising the same.

BACKGROUND ART

The crystal of magnesium hydroxide belongs to hexagonal system and is generally platy in appearance with its thickness as a c-axis direction and its width as an a-axis direction because crystal growth in the a-axis direction differs from crystal growth in the c-axis direction.

Conventional magnesium hydroxide has a thickness of about 0.01 to 1.0 µm, a width of 0.01 to 1 µm and an aspect ratio of about 2 to 6.

Therefore, the conventional magnesium hydroxide is used as an antiacid (stomach antacid), a stabilizer for vinyl chloride, a laxative agent, a flu-gas desulfurizing agent, a magnesia fertilizer or a food additive (magnesium reinforcement), making use of its chemical properties and as a flame retardant for resins (use of heat absorption properties at the time of thermal decomposition), making use of its physical properties.

Magnesium hydroxide is a rare substance having the highest nontoxic level and inexpensive as its raw material is seawater rich in resources or underground water. However, the number of its uses is small. Therefore, the development of its new use by providing a new function is worthwhile environmentally and economically.

The inventors of the present invention already invented magnesium hydroxide whose crystal grows well and which is almost monodisperse (almost free from secondary agglomeration) and proposed its new use as a flame retardant for resins (JP-A 52-115799), and the magnesium hydroxide is now widely used. This has no safety problem at all as compared with other flame retardants such as organic halides and phosphoric acid esters all of which have problems such as toxicity.

However, magnesium hydroxide must be used in an amount of about 170 parts or more by weight based on 100 parts by weight of a resin, which degrades the physical properties such as mechanical strength of the resin. Therefore, novel magnesium hydroxide which does not degrade flame retardancy even with a much smaller amount thereof has been desired for a long time.

DISCLOSURE OF THE INVENTION

It is an object of the present invention to provide magnesium hydroxide having a high aspect ratio and a production method thereof. It is another object of the present invention to provide a resin composition which comprises magnesium hydroxide having a high aspect ratio and has a high flexural modulus and excellent impact strength. It is still another object of the present invention to provide a resin composition which has excellent flame retardancy even when the content of magnesium hydroxide is low.

The inventors conducted intensive studies on a method of producing magnesium hydroxide having a high aspect ratio. As a result, they found that when a monovalent organic acid is made existent in the production of magnesium hydroxide which is carried out by hydrothermally treating slurry coprecipitated by adding an alkali to a water-soluble magnesium salt, magnesium hydroxide having a high aspect ratio is obtained. Thus, the present invention was accomplished based on this finding.

That is, the present invention includes the following inventions.

1. Magnesium hydroxide having a long diameter (width) of not less than 0.5 µm and an aspect ratio of not less than 10.
2. The magnesium hydroxide in the above paragraph 1 which has a long diameter of not less than 1.0 µm.
3. The magnesium hydroxide in the above paragraph 1 which has an aspect ratio of not less than 20.
4. The magnesium hydroxide in the above paragraph 1 which has a long diameter of not less than 1 µm and an aspect ratio of not less than 20.
5. The magnesium hydroxide in the above paragraph 1 which is surface treated with at least one selected from the group consisting of an anionic surfactant, a silane-based, titanium-based or aluminum-based coupling agent, a phosphoric acid ester and silicone oil.
6. A resin composition comprising 100 parts by weight of a resin and 0.1 to 200 parts by weight of magnesium hydroxide having a long diameter of not less than 0.5 µm and an aspect ratio of not less than 10.
7. The resin composition in the above paragraph 6, wherein the resin is polypropylene or a mixture of polypropylene and an olefin-based rubber, and the composition comprises 1 to 100 parts by weight of magnesium hydroxide based on 100 parts by weight of the resin and is used for car bumpers and dashboards.
8. The resin composition in the above paragraph 6 which comprises 50 to 170 parts by weight of magnesium hydroxide based on 100 parts by weight of the resin.
9. A method of producing the magnesium hydroxide in the above paragraph 1, comprising the steps of:
   (A) adding an alkali to and coprecipitating it with a mixed aqueous solution of a water-soluble magnesium salt and a monovalent organic acid or a salt thereof, or
   (B) adding an alkali aqueous solution to and coprecipitating it with an aqueous solution of a water-soluble magnesium salt and adding a monovalent organic acid or a salt thereof to the resulting product; and
   (C) hydrothermally treating the obtained slurry at 100° C. or higher.

BEST MODE FOR CARRYING OUT THE INVENTION

<Magnesium Hydroxide>
(Long Diameter, Thickness)

The magnesium hydroxide of the present invention has a long diameter (width) of not less than 0.5 µm, preferably not less than 1 µm, more preferably not less than 2 µm. The upper limit of the long diameter is preferably 10 µm.

The thickness of the crystal of the magnesium hydroxide of the present invention is preferably 0.01 to 0.5 µm, more preferably not more than 0.2 µm, much more preferably not more than 0.1 µm.

In the present invention, as for the method of measuring the long diameter and the thickness, (1) the long diameter and the thickness are obtained from the arithmetic averages of the measurement width and thickness values of arbitrary 10 crystalites in a SEM photo of magnesium hydroxide.

(2) The long diameter and the thickness may also be calculated from an average secondary particle diameter measured by a laser diffraction scattering method and a specific surface area measured by a BET method. In this case, the magnesium hydroxide of the present invention has a long diameter (width) of not less than 0.1 μm, preferably not less than 1.0 μm, more preferably not less than 5.0 μm. The upper limit of the long diameter is preferably 10.0 μm. The thickness of the crystal is preferably 0.01 to 0.5 μm, more preferably not more than 0.1 μm, much more preferably not more than 0.05 μm.

(3) The long diameter and the thickness may also be actually measured by means of an atomic force microscope. In this case, the magnesium hydroxide of the present invention has a long diameter (width) of not less than 0.1 μm, preferably not less than 1.0 μm, more preferably not less than 5.0 μm. The upper limit of the long diameter is preferably 10 μm. The thickness of the crystal is preferably 0.01 to 0.2 μm, more preferably not more than 0.1 μm, much more preferably not more than 0.05 μm.

(Aspect Ratio)

The magnesium hydroxide of the present invention has an aspect ratio (long diameter/thickness) of not less than 10, preferably not less than 20, more preferably not less than 30. The aspect ratio is a value obtained by dividing the arithmetic average of width by the arithmetic average of thickness. The width and the thickness are obtained by the above method (1).

The aspect ratio (long diameter/thickness) obtained by the above method (2) of the magnesium hydroxide of the present invention is not less than 10, preferably not less than 20, more preferably not less than 30. The aspect ratio (long diameter/thickness) obtained by the above method (3) of the magnesium hydroxide of the present invention is not less than 10, preferably not less than 30, more preferably not less than 50.

Since the magnesium hydroxide of the present invention is highly oriented, it can be used for many other purposes such as a gas barrier property improving agent for packaging resin films, a corrosion inhibitor for anticorrosive paints, an adiabatic material and a base material for pearl pigments in addition to the above new uses.

The magnesium hydroxide of the present invention is represented by the following formula.

Since the thin crystals of magnesium hydroxide are aligned parallel to the plane of a resin film and magnesium hydroxide itself does not transmit gas, it can provide gas barrier properties to a resin having high permeability for gas such as oxygen. In the case of paint, magnesium hydroxide reduces the permeation speed of water and an ion which are corrosion causative substances through a coating film and prevents them from reaching a metal. In addition, magnesium hydroxide adsorbs a corrosion causative anion such as a chlorine ion, thereby making it possible to improve corrosion resistance.

When magnesium hydroxide is used as a flame retardant for resins, as described in JP-A 9-227784, as the total content of impurities is lower, flame retardancy becomes higher. The magnesium hydroxide of the present invention has a total content of impurities such as an iron compound and a manganese compound of not more than 200 ppm, preferably not more than 100 ppm in terms of metals (Fe+Mn). More preferably, it is more advantageous that the total content of (Fe+Mn+Co+Cr+Cu+V+Ni) as metals of heavy metal compounds including a cobalt compound, a chromium compound, a copper compound, a vanadium compound and a nickel compound should be not more than 200 ppm, preferably not more than 100 ppm.

Further, in the present invention, magnesium hydroxide having a total content of water-soluble impurities of not more than 500 ppm, preferably not more than 300 ppm, most preferably not more than 100 ppm in terms of Na is used to retain the excellent water-resistant insulating properties and acid resistance of a molded article.

(Surface Treatment)

It is preferred that the magnesium hydroxide of the present invention should be subjected to a surface treatment when it is compounded with a resin. Examples of the surface treating agent include anionic surfactants such as higher fatty acids, phosphoric acid esters, silane coupling agents, titanate coupling agents, aluminum coupling agents and silicone. The surface treating agent is preferably used in an amount of 0.1 to 5 wt % based on magnesium hydroxide.

The surface treatment is preferably carried out by a wet process or a dry process. The wet process is a process in which magnesium hydroxide is dispersed in a solvent such as water or an alcohol and a surface treating agent is added to the obtained dispersion under agitation. The dry process is a process in which a surface treating agent is added to powdery magnesium hydroxide under agitation with a high-speed stirring machine such as a Henschel mixer.

<Method of Producing Magnesium Hydroxide>

The magnesium hydroxide of the present invention can be produced by (A) adding an alkali to and coprecipitating it with a mixed aqueous solution of a water-soluble magnesium salt and a monovalent organic acid or a salt thereof, or (B) adding an alkali aqueous solution to and coprecipitating it with an aqueous solution of a water-soluble magnesium salt and adding a monovalent organic acid or a salt thereof, and (C) hydrothermally treating the obtained slurry at 100° C. or higher.

Examples of the water-soluble magnesium salt include magnesium chloride, magnesium nitrate, magnesium sulfate, magnesium acetate and magnesium lactate.

Examples of the monovalent organic acid include monocarboxylic acids such as formic acid, acetic acid, propionic acid, butanoic acid and lactic acid. Monosulfonic acids such as methanesulfonic acid, p-toluenesulfonic acid and sulfanilic acid may also be used. Monocarboxylic acids are preferred as the monovalent organic acid. Out of these, acetic acid, propionic acid and butanoic acid are particularly preferred.

Examples of the monovalent organic acid salt include alkali metal salts such as sodium and potassium salts and ammonium salts.

Examples of the alkali include alkali metal hydroxides such as sodium hydroxide and potassium hydroxide, alkali earth metal hydroxides such as calcium hydroxide, and ammonium hydroxide.

The hydrothermal treatment is carried out at 100° C. or higher, preferably 120 to 250° C., more preferably 130 to 200° C. The treatment time is preferably 1 to 20 hours.

After the hydrothermal treatment, the high-aspect-ratio magnesium hydroxide of the present invention can be produced by suitably selecting commonly used steps such as filtration, rinsing, emulsification, surface treatment, filtration, drying, grinding and classification and carrying out them.

(Resin Composition)

The resin composition of the present invention comprises 0.1 to 200 parts by weight, preferably 1 to 150 parts by weight of magnesium hydroxide based on 100 parts by weight of a resin.

There are no special restrictions on the method of mixing and kneading together the resin and magnesium hydroxide, and a method capable of mixing them together uniformly is employed. For example, they are mixed and kneaded together by means of a single-screw or double-screw extruder, a roll or a Banbury mixer.

Also, there are no special restrictions on the molding method. Molding means known per se can be arbitrarily employed according to the types of the resin and the rubber and the type of a desired molded article. Examples thereof include injection molding, extrusion molding, blow molding, press molding, rotary calender molding, sheet forming, transfer molding, lamination molding and vacuum molding.

The resin used in the present invention means a resin and/or a rubber, as exemplified by thermoplastic resins such as polyethylene, a copolymer of ethylene and another α-olefin, a copolymer of ethylene and vinyl acetate, a copolymer of ethylene and ethyl acrylate or a copolymer of ethylene and methyl acrylate, polypropylene, a copolymer of propylene and another α-olefin, polybutene-1, poly4-methylpentene-1, polystyrene, a copolymer of styrene and acrylonitrile, a copolymer of ethylene and propylene diene rubber or butadiene, polyvinyl acetate, polyvinyl alcohol, polyacrylate, polymethacrylate, polyurethane, polyester, polyether, polyimide, ABS, polycarbonate and polyphenylene sulfide, thermosetting resins such as phenol resin, melamine resin, epoxy resin, unsaturated polyester resin and alkyd resin, EPDM, SBR, NBR, butyl rubber, chloroprene rubber, isoprene rubber, chlorosulfonated polyethylene rubber, silicon rubber, fluorine rubber, chlorinated butyl rubber, brominated butyl rubber, epichlorohydrin rubber and chlorinated polyethylene.

The resin is preferably polypropylene. Also, the resin is preferably a mixture of polypropylene and an olefin-based rubber. The content of the olefin-based rubber is preferably 5 to 60 parts by weight, more preferably 10 to 40 parts by weight based on 100 parts by weight of polypropylene.

The resin composition of the present invention may comprise a conventionally known reinforcement such as talc, mica, glass fibers or basic magnesium sulfate fibers besides magnesium hydroxide. The amount of the reinforcement is 1 to 50 parts by weight based on 100 parts by weight of the resin.

Besides the reinforcement, other commonly used additives such as an antioxidant, an ultraviolet absorbent, a lubricant, a pigment exemplified by carbon black, a bromine-based or phosphate-based flame retardant, a flame retarding aid exemplified by zinc stannate, alkali metal salts of stannic acid and carbon powder, and a filler exemplified by calcium carbonate may be suitable selected and used.

The amount of the antioxidant is preferably 0.01 to 5 parts by weight based on 100 parts by weight of the resin. The amount of the ultraviolet absorbent is preferably 0.01 to 5 parts by weight based on 100 parts by weight of the resin. The amount of the lubricant is preferably 0.1 to 5 parts by weight based on 100 parts by weight of the resin. The amount of the pigment is preferably 0.01 to 5 parts by weight based on 100 parts by weight of the resin. The amount of the flame retardant is preferably 0.1 to 50 parts by weight based on 100 parts by weight of the resin. The amount of the flame retarding aid is preferably 0.01 to 10 parts by weight based on 100 parts by weight of the resin. The amount of the filler is preferably 1 to 50 parts by weight based on 100 parts by weight of the resin.

EXAMPLES

The following examples are provided for the purpose of further illustrating the present invention but are in no way to be taken as limiting.

Example 1

3.4 liters of a sodium hydroxide aqueous solution having a concentration of 2 mols/L was added to 4 liters of a mixed aqueous solution of first-grade reagent magnesium chloride and sodium acetate (Mg=1.0 mol/L, sodium acetate=1.5 mol/L, 30° C.) under agitation to carryout a coprecipitation reaction. 1 liters of the obtained reaction product was collected and hydrothermally treated in an autoclave at 160° C. for 5 hours. After the treated product was cooled to 100° C. or lower, it was taken out from the autoclave, filtered, rinsed, dried and ground to obtain magnesium hydroxide.

The obtained magnesium hydroxide was observed through a SEM to take a photo thereof so as to measure the widths and thicknesses of 10 crystallites and average the measurement data. As a result, the width was 2.1 µm, the thickness was 0.09 µm and therefore, the aspect ratio was 23.

Example 2

3 liters of ammonia water (35° C.) having a concentration of 4 mols/L was added to 4 liters of a mixed aqueous solution of first-grade reagent magnesium nitrate and ammonium acetate (Mg=1.5 mols/L, ammonium acetate=1.5 mols/L, 35° C.) under agitation to carry out a coprecipitation reaction. After 1 liters of the obtained reaction product was collected and hydrothermally treated in an autoclave at 200° C. for 4 hours, magnesium hydroxide was obtained in the same manner as in Example 1.

The obtained magnesium hydroxide was observed through a SEM to take a photo thereof. As a result of its measurement, the obtained crystallite had a width of 3.2 µm, a thickness of 0.08 µm and therefore, aspect ratio of 40.

Example 3

Magnesium hydroxide was obtained in the same manner as in Example 1 except that sodium propionate having a concentration of 0.5 mol/L was used in place of sodium acetate in Example 1. The obtained magnesium hydroxide was observed through a SEM to take a photo thereof. As a result of its measurement, the obtained crystallite had a width of 1.8 µm, a thickness of 0.11 µm and therefore, an aspect ratio of 16.

Comparative Example 1

Magnesium hydroxide was obtained in the same manner as in Example 1 except that sodium acetate was not used. The obtained magnesium hydroxide crystallite had a width of 1.1 µm, a thickness of 0.30 µm and an aspect ratio of 4.

Table 1 shows the amounts of impurities contained in magnesium hydroxides produced in Examples 1 to 3.

TABLE 1

|  | Example 1 | Example 2 | Example 3 |
|---|---|---|---|
| Aspect ratio | 23 | 40 | 16 |
| Na (%) | 0.002 | 0.001 | 0.001 |
| Fe (%) | 0.001 | 0.005 | 0.002 |
| Mn (%) | 0.002 | 0.001 | 0.001 |
| Cu (%) | ≤0.0001 | ≤0.0001 | ≤0.0001 |
| V (%) | ≤0.0001 | ≤0.0001 | ≤0.0001 |
| Co (%) | ≤0.0001 | ≤0.0001 | ≤0.0001 |
| Ni (%) | ≤0.0001 | ≤0.0001 | ≤0.0001 |
| Cr (%) | ≤0.0001 | ≤0.0001 | ≤0.0001 |

Table 2 shows the aspect ratios of magnesium hydroxides produced in Examples 1 to 3 and Comparative Example 1.

TABLE 2

|  | Example 1 | Example 2 | Example 3 | Comparative Example 1 |
|---|---|---|---|---|
| SEM method | 23 | 40 | 16 | 4 |
| Calculated from particle diameter and BET value | 23.4 | 40.0 | 16.4 | 3.7 |
| Atomic force microscope | 40 | 70 | 27 | 8 |

Example 4

Resin Composition 500 g of magnesium hydroxide powders having a high aspect ratio produced in Example 1 was put into a Henschel mixer, 5 g of vinyl silane corresponding to 1% of the weight of magnesium hydroxide was diluted with 50 mL of ethanol under high-speed agitation, and the resulting product was added to the powders to treat the surfaces of the magnesium hydroxide powders. The obtained product was dried at 120° C. and mixed with polypropylene (ethylene-propylene copolymer, BC-6) in a weight ratio of 43:100, the mixture was melt kneaded by means of a double-screw extruder at 190° C., and the kneaded product was cooled and cut into pellets. The pellets were put into a vacuum drier to be dried and injection molded at about 230° C. to prepare a specimen.

The obtained specimen was used to measure its mechanical strength which is shown in Table 3.

Comparative Example 2

Resin Composition

Talc (CRS-6002 of Tatsumori Ltd.) which is commonly used as a reinforcement for resins and used in the dashboard of a car was surface treated with 1 wt % of aminosilane based on the talc in the same manner as in Example 4. Thereafter, the surface treated talc was melt kneaded with polypropylene and molded to prepare a specimen in the same manner as in Example 4. The evaluation results of the specimen are shown in Table 3.

Comparative Example 3

Resin Composition

Magnesium hydroxide produced by the prior art method shown in Comparative Example 1 was surface treated in the same manner as in Example 4, melt kneaded with polypropylene and molded to prepare a specimen. The evaluation results of the specimen are shown in Table 3.

TABLE 3 mechanical strength of polypropylene containing 30 wt % of filler

| | Filler | | | |
|---|---|---|---|---|
| Mechanical strength | High-aspect-ratio magnesium hydroxide (Example 4) | Talc (Comparative Example 2) | Conventional magnesium hydroxide (Comparative Example 3) | Control (polypropylene) |
| Flexural strength (MPa) | 49.5 | 47.2 | 41.8 | 31.0 |
| Flexural modulus (MPa) | 3910 | 2890 | 2160 | 1050 |

As obvious from Table 3, high-aspect-ratio magnesium hydroxide has a greater reinforcing effect than that of talc which is a reinforcement for resins.

Example 5

Flame Retardancy of Resin Composition

Specimens were prepared in the same manner as in Example 4 except that the resin was substituted by polyethylene (EEA) and the amount of high-aspect-ratio magnesium hydroxide was changed from 63% to 55% at intervals of 1% based on the total weight of polyethylene and magnesium hydroxide. The flame retardancy of each of the prepared specimens having a thickness of ⅛ inch (about 3.2 mm) was evaluated in accordance with a UL94 vertical flammability test method.

As a result, it was found that the minimum amount of magnesium hydroxide for achieving V-0 rating was 57 wt %.

Comparative Example 4

Flame Retardancy of Resin Composition

Specimen were prepared in the same manner as in Example 5 except that the amount of magnesium hydroxide produced by the prior art method in Comparative Example 1 to be mixed with polypropylene was changed so as to evaluate flame retardancy. As a result, the minimum amount of magnesium hydroxide for achieving V-0 rating was 63 wt %. Therefore, the high-aspect-ratio magnesium hydroxide is superior to conventional magnesium hydroxide in flame retarding effect.

EFFECT OF THE INVENTION

The magnesium hydroxide of the present invention has a novel structure with a high aspect ratio and a fully developed width. This structural feature makes the magnesium hydroxide of the present invention more useful as a reinforcement or reinforcing material for resins than glass fibers, talc and mica.

A resin composition comprising the magnesium hydroxide of the present invention has a high flexural modulus and excellent impact strength. Since magnesium hydroxide has high purity, the heat resistance of the resin composition is improved so that it is useful as a reinforcement for various products, for example, car bumpers and dashboards.

The resin composition comprising the magnesium hydroxide of the present invention has excellent flame retardancy. As for the mechanism of improving flame retardancy, it is considered that the thickness of the resin surrounded by magnesium hydroxide becomes small as the thickness of the magnesium hydroxide becomes smaller than that of the conventional magnesium hydroxide, whereby the resin portion is divided into small pieces and the amount of heat generated by the combustion of the resin is reduced. In addition, it is considered that the decomposition start temperature of magnesium hydroxide itself lowers as the thickness of magnesium hydroxide becomes small, whereby the heat absorption function of magnesium hydroxide works more efficiently.

The invention claimed is:

1. A hexagonal high aspect ratio magnesium hydroxide represented by the following formula:

$Mg(OH)_2$, wherein the magnesium hydroxide has a long diameter (width) of 1 to 10 µm, a thickness of not more than 0.2 µm and an aspect ratio of not less than 20, and wherein the magnesium hydroxide has a total content of an iron compound, a manganese compound, a cobalt compound, a chromium compound, a copper compound, a vanadium compound, and a nickel compound of not more than 200 ppm in terms of metals (Fe+Mn+Co+Cr+Cu+V+Ni).

2. The hexagonal high aspect ratio magnesium hydroxide according to claim 1 which has a thickness of not more than 0.1 µm.

3. A resin composition comprising 100 parts by weight of a resin and 0.1 to 200 parts by weight of a hexagonal high aspect ratio magnesium hydroxide represented by the following formula:

$Mg(OH)_2$, wherein the magnesium hydroxide has a long diameter (width) of 1 to 10 µm, a thickness of not more than 0.2 µm and an aspect ratio of not less than 20, and wherein the magnesium hydroxide has a total content of an iron compound, a manganese compound, a cobalt compound, a chromium compound, a copper compound, a vanadium compound, and a nickel compound of not more than 200 ppm in terms of metals (Fe+Mn+Co+Cr+Cu+V+Ni).

4. A method of producing a hexagonal high aspect ratio magnesium hydroxide having a long diameter (width) of 1 to 10 µm, a thickness of not more than 0.2 µm and an aspect ratio of not less than 20, which comprises the steps of:

(A) adding an alkali to and coprecipitating it with a mixed aqueous solution of a water-soluble magnesium salt and a monovalent organic acid, an alkali metal salt of a monovalent organic acid or an ammonium salt of a monovalent organic acid, or (B) adding an alkali aqueous solution to and coprecipitating it with an aqueous solution of a water-soluble magnesium salt and adding a monovalent organic acid, an alkali metal salt of a monovalent organic acid or an ammonium salt of a monovalent organic acid to the resulting product; and (C) hydrothermally treating the obtained slurry at 100 to 250° C.

5. The hexagonal high aspect ratio magnesium hydroxide of claim 1 which has a long diameter of 2 to 10 µm, a thickness of not more than 0.1 µm and an aspect ratio of not less than 30.

6. The resin composition of claim 3, wherein the content of the magnesium hydroxide is 0.1 to 100 parts by weight based on 100 parts by weight of the resin, and wherein the magnesium hydroxide has a long diameter of 2 to 10 µm, a thickness of not more than 0.1 µm and an aspect ratio of not less than 30.

* * * * *